April 21, 1970 W. M. HALLIDY 3,508,092
HEAT SINK FOR STATOR WINDING OF DYNAMO-ELECTRIC MACHINE
Filed June 19, 1968
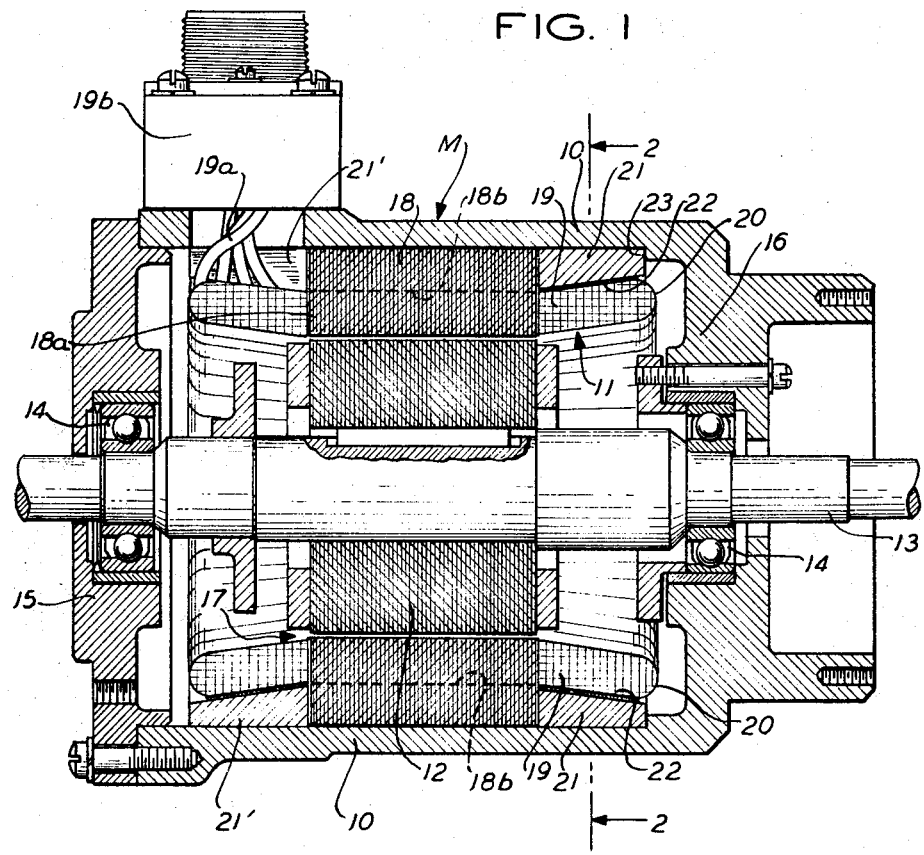
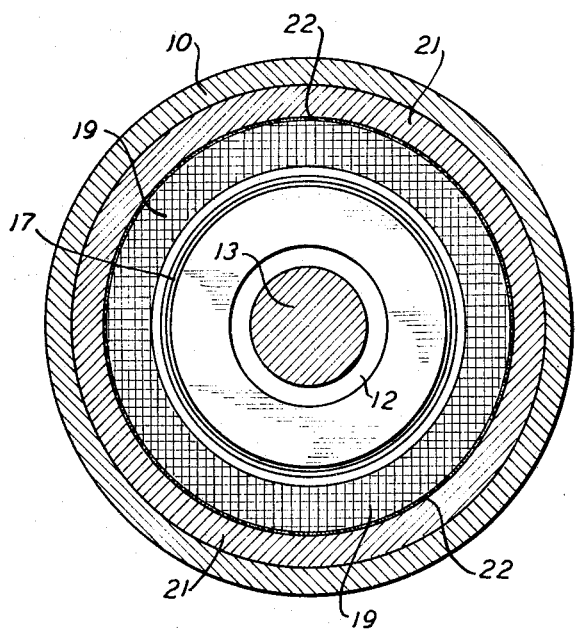
INVENTOR
WILLIAM M. HALLIDY
BY
*F B Henn*
ATTORNEY

United States Patent Office 3,508,092
Patented Apr. 21, 1970

3,508,092
HEAT SINK FOR STATOR WINDING OF DYNAMO-ELECTRIC MACHINE
William M. Hallidy, Glendora, Calif., assignor to Air Reduction Company, Incorporated, New York, N.Y., a corporation of New York
Filed June 19, 1968, Ser. No. 738,262
Int. Cl. H02k 5/16
U.S. Cl. 310—64                                      1 Claim

ABSTRACT OF THE DISCLOSURE

An electric motor of compact size and comparatively large power rating has a heat sink for the stator winding, wherein an aluminum ring is interposed between the stator winding end-turns and the enclosing metal housing of the motor for transferring excessive heat from the winding. The winding end-turns, at one or both sides of the stator, depending on required heat dissipation, are mechanically and thermally bonded to the respective heat transfer ring or rings, by a heat conducting epoxy resin. The respective ring in turn, is mounted in direct heat conducting engagement with the inner wall of the motor housing for constituting in combination therewith, the heat sink.

---

This invention relates to heat dissipating means for dynamo-electric machines and in particular to a heat sink for the stator winding of such machines.

Heat dissipation at a sufficient rate for preventing overheating and "hot spots," with subsequent insulation breakdown in the stator coils of compact dynamo-electric machines of high power rating is a long-standing and inherently difficult problem. Because of restricted space and other reasons, conventional methods of cooling by air circulation through the machine are in general, not practical; also the compact internal structure of the machine, having very limited surface area for heat dissipation, lends itself to high heat build-up where conventional conduction and/or convection heat-transfer arrangements are used. For example, in a high speed 20 HP motor for a helium compressor with the stator coils mounted according to prior practice, the $I^2R$ energy loss in the stator winding incident to normal operation at rated power, caused serious overheating of the coils, followed by failure of the motor. The heating problem above, was satisfactorily and economically solved by the invention, and continuous and full-rated power output was then achieved without overheating of the motor.

In accordance with the invention, overheating of the stator winding coils of a compact, high-power dynamo-electric machine is effectively precluded by means of a heat sink (apart from the stator core) thermally connected to the stator-winding itself. The heat sink per se comprises the combination of heat transfer structure of high conductivity making thermal contact with the winding, and the metal enclosing housing of the machine, that in turn, makes thermal contact with the heat transfer structure. In a specific application, the heat transfer structure consists of one or more metal annular members or rings of good heat conductivity, such as aluminum, that encompass and are thermally bonded to a respective portion of the winding, such as the coil end-turns for example; also, the heat transfer ring makes solid contact with the metal housing for establishing a direct heat transfer path of low resistance between the winding and the exteriorly cooled housing wall.

The principal object of the invention therefore, is an improved dynamo-electric machine of compact size and high power rating wherein over-heating of the stator winding incident to normal operation of the machine is eliminated.

A further and related object is an improved machine of the character above, wherein application of the invention can be made economically and simply, and without significant alteration to existing designs of similar type machines.

Other objects, features and advantages will appear from the following description with reference to the accompanying drawing, in which:

FIG. 1 is a side view, partly in section, of a dynamo-electric machine embodying the invention, and FIG. 2 is a sectional view taken along the lines 2—2 of FIG. 1.

Referring to FIG. 1, the dynamo-electric machine illustrated by way of example, is a small, high-power, high-speed electric motor M having useful application to aerospace projects wherein high power output must be compatible with compactness and low mass. The motor comprises a generally cylindrical metal casing 10 for housing in conventional manner a stator 11 and rotor 12. The housing exterior wall may be cooled by cooling fins (not shown). The rotor is mounted within the stator and spaced therefrom by the concentric air gap 17, the rotor shaft 13 being journaled in bearings 14 mounted within the end walls 15 and 16 respectively, of the housing.

Specifically, the stator comprises a laminated iron core 18 with circumferentially spaced pole pieces 18a forming part of the housing-stator assembly, and a stator winding 19 that is coiled in conventional manner, and disposed in slots 18b formed between the pole pieces, as generally indicated in FIG. 2. The stator winding is connected in conventional manner to exterior circuitry through the lead conductors and terminal box indicated at 19a and 19b, respectively.

The looped coils of the winding at the end-turns 20, overhang the stator core at opposite sides thereof as indicated in FIG. 1, and are spaced from the side and end walls of the housing, respectively. In prior practice, the space between the end-turns and the housing was generally left open for cooling by forced or convection currents of a suitable gas or air.

It was found in developing the invention that a compact-design motor as described above, subject to serious overheating with subsequent failure when it was connected to a required load of about 20 HP, could operate normally up to its required power rating without overheating, when efficient heat-transfer structure was thermally connected according to the invention directly between the overhanging end-turns 20 of the stator winding and the enclosing housing wall 10. In other words, the housing wall is thermally combined with the interposed heat-transfer structure to constitute a heat-sink having low resistance to heat conduction, that in turn, drains heat from the stator winding at sufficient rate for preventing excessive build-up of heat and "hot-spots" within the winding.

To this end, the heat-transfer structure consists of heat conducting means that in general, encompasses the winding end-turns, and for convenience and economy, has ring-like form; preferably the encompassing heat conducting means is continuous circumferentially, and consists of an annulus or ring 21 of good heat conducting material such as aluminum. This device has been found very effective for establishing a direct conducting path of low heat-transfer resistance between the stator winding and the metal housing. The cross-sectional area of the aluminum ring 21 is shown as conforming to the space between the end-turns and housing wall for ensuring a snug fit between the inner and outer peripheral surfaces of the ring respectively, and the end-turns and housing wall. The inner peripheral surface of the ring is bonded at 22 to the winding end-turns, preferably by a thermal-type epoxy resin having suitable heat conducting properties. The ring 21 is locked against transverse displacement by the stator core 18 and a shoulder 23 formed by the housing wall.

Although two heat transfer rings 21 and 21' are shown in FIG. 1, each mounted between the respective end-turns of the stator winding and the housing wall, but one ring may be required under less severe operating conditions, for limiting heat build-up in the stator winding. In fact, a single ring on the end-turns at one side only, in a motor of the type above, was found sufficient under normal load conditions to limit winding temperature increase to a tolerable value.

In the motor structure shown, the heat transfer rings are supplemental to the basic design ordinarily relied upon for heat transfer by conduction from the stator. In other words, there is conduction of stator heat to the housing 10 at the outer periphery of the iron core 18, FIG. 1; however, the heat conductivity of iron is poor as compared with aluminum for example, so that the stator core alone may be inadequate for dissipating excess heat in the stator winding at sufficient rate for preventing "hot-spots" in the winding. On the other hand where the invention was used, temperature tests using thermocouples placed at different points in the stator, showed for example that the aluminum ring ran much cooler than the iron core at similar distances from the housing; also that the end-turns ran much cooler than the winding at points centrally of the core in the slot openings.

Accordingly, it will be seen that build-up of excess heat in any part of the stator winding is precluded by conduction of the heat to the comparatively cooler end-turns where direct heat transfer to the yet cooler housing wall takes place; also that the invention can be used in an inexpensive and simple manner with conventional stator core and winding structures wtihout any significant alteration or relocation thereof.

Summarizing the normal operation of the motor embodying the invention, the excess stator winding heat is drawn from the winding proper at the over-hanging end-turns through the heat-transfer ring 21, to the exteriorly cooled housing wall where it is readily dissipated. The excess heat in the rotor (which can tolerate higher temperatures than the winding insulation) is readily dissipated by convection currents that transfer the heat to the housing walls.

Although especially useful in aerospace projects wherein an optimum is desired as regards the combination of power output, compactness and low mass, it will be obvious that the invention is generally useful in projects wherein a generator or motor of high power rating must operate within a very small space.

Having set forth the invention in what is considered to be the best embodiment thereof, it will be understood that changes may be made in the apparatus as above set forth without departing from the spirit of the invention or exceeding the scope thereof as defined in the following claim.

I claim:

1. A dynamo-electric machine comprising, a stator including a winding and a core, a rotor operatively positioned with respect to the stator, a heat conducting housing enclosing the stator and rotor, said stator winding having end-turns overhanging the side of the sator core, a heat-sink supplemental to the stator core positioned between said end-turns and in direct peripheral contact with the inner wall of the heat conducting housing, said heat-sink comprising a ring of solid aluminum bonded to the end-turns with a heat conducting resin, an internal shoulder in said heat conducting housing, said aluminum ring being positioned between said shoulder and said stator core and being locked against transverse displacement due to contact with said shoulder and with said stator core, said aluminum ring serving to readily dissipate stator heat.

References Cited

UNITED STATES PATENTS

| 2,824,983 | 2/1958 | Cametti | 310—64 |
| 3,075,103 | 1/1963 | Ward | 310—260 X |
| 3,075,107 | 1/1963 | Eis et al. | 310—64 |
| 3,109,947 | 11/1963 | Thompson et al. | 310—64 |

MILTON O. HIRSHFIELD, Primary Examiner

D. F. DUGGAN, Assistant Examiner

U.S. Cl. X.R.

310—260